United States Patent Office 2,902,248
Patented Sept. 1, 1959

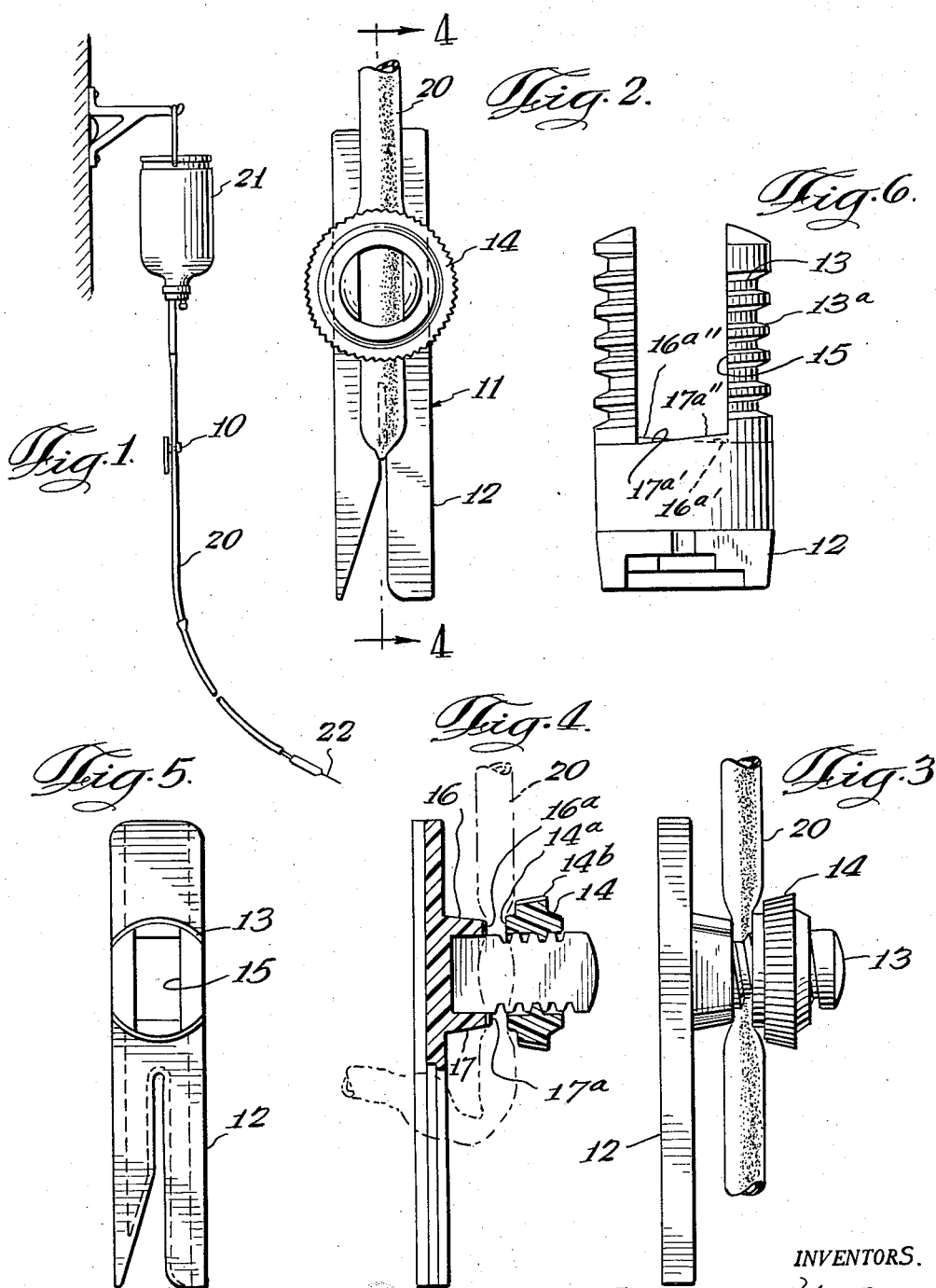

2,902,248

FLOW REGULATOR

Raymond W. Barton and Joe T. Herron, Evansville, Ind., assignors to Mead Johnson & Company, a corporation of Indiana Application January 22, 1957, Serial No. 635,328

5 Claims. (Cl. 251—8)

This invention relates to a flow regulator and in particular to a flow regulator for controlling the flow of parenteral fluid through a compressible tube.

The flow regulator of the instant invention is an improvement of the flow regulator disclosed in the copending application of Raymond W. Barton and Robert Donovan Thompson, Serial No. 504,398, filed April 28, 1955. The present regulator provides an improved control of the rate of flow, particularly at the lower rates of flow such as used in parenteral administration to children.

It has been found that the resilient nature of the tubing conventionally utilized in parenteral systems may cause a change in the rate of flow of fluid through the tubing, notwithstanding a maintained setting of the tube constricting means associated with the flow regulator. This is apparently due to the "cold flow" characteristics of the materials of which the tubing is constructed (normally, plastic or rubber). Thus, at the time of constriction of the tube, the material thereof is stretched away from the point of constriction. However, after a period of time, the material tends to return to this this point of constriction, thereby reducing the cross-sectional area of the lumen or tube opening, and changing the rate of flow of liquid therethrough. For example, it has been found that with plastic tubing of .118 inch inside diameter, which is constricted at one portion therof to obtain a rate of flow of one cubic centimeter per minute, a decrease of approximately 80 to 90% in the rate of flow may occur within 30 minutes. It is obvious that such a variation in the rate of flow is highly undesirable.

A principal feature of this invention is to provide a new and improved flow regulator arranged to minimize variation in the rate of flow obtained with a given setting.

Another feature of the invention is the provision of a flow regulator having a plurality of tube constricting portions for effecting a flow controlling constriction of the tube at a plurality of longitudinally spaced points thereof.

A further feature of the invention is the provision of a flow regulator having a tube constricting means arranged to engage the tube to provide an enlarged space at one portion of the tube being constricted to compensate for the flow changing characteristics of the more tightly constricted portion of the tube.

Still another feature is the provision of a flow regulator having a base with a stud upstanding therefrom and having a tube receiving, diametric channel therethrough, a pair of walls upstanding from the base to support a tube extending through the channel with the wall edges engaging the tube being inclined in the same angular direction as the stud thread, and with the mid-point of the wall edges lying on a common diameter of the stud, and a nut threaded on the stud member and having a lower edge lying in a plane perpendicular to the nut axis for pressing the tube against the upper edge of the wall.

A yet further feature of the invention is the provision of a new and improved nut member having a lateral extension substantially outwardly beyond the walls upstanding from the base, for improved ease of manipulation and adjustment of the tube constriction.

Other features and advantages will be apparent from the following description taken in connection with the accompanying drawings, wherein:

Figure 1 is an elevational view of a parenteral system having a flow regulator embodying the invention;

Figure 2 is an enlarged, side elevational view of the flow regulator shown carried on a portion of a parenteral system tube;

Figure 3 is an enlarged, elevational view of the flow regulator installed on a portion of the parenteral system tube as seen in Figure 1;

Figure 4 is a longitudinal section taken approximately along the line 4—4 of Figure 2;

Figure 5 is a side elevational view of the base member; and

Figure 6 is an enlarged, end elevational view thereof.

In the exemplary embodiment of the invention as disclosed in the drawings, an improved flow regulator generally designated 10 is shown installed on a portion of a compressible tube 20 for conducting fluids from a parenteral fluid container 21. The fluid is delivered from a container 21 and tube 20 by action of gravity and is administered to a recipient by a suitable injecting means 22. The rate of flow of the parenteral fluid is accurately determined by the setting of regulator 10 which effects this control by suitably constricting the tubing whereby the lumen or opening through the tube is adjusted in cross-section to permit the desired flow rate. Tube 20 is conventionally formed of resilient material such as a plastic or rubber and flow regulator 10 is arranged to compensate for the "cold flow" characteristics thereof to minimize any change in the cross-section of the lumen resulting from the "cold flow" of the tube after the original adjustment.

Referring now to Figures 2 through 6, the specific construction of the improved flow regulator may be seen. A first or base member 11 comprises a base 12, upstanding from the mid-portion of which is a threaded stud portion 13. Threadedly mounted on stud portion 13 for movement toward and away from the base 12 is a nut member 14. Extending diametrically through stud portion 13 and longitudinally of base 12 is a slot or tube receiving channel 15 across which nut member 14 may move.

A plurality of upstanding walls are provided on base 12 for coaction with nut 14 in constricting a tube in channel 15. In the illustrative embodiment, two such walls 16 and 17 are provided, and are disposed at opposite ends of the channel. The upper edges of these walls, edges 16a and 17a respectively, are inclined to a plane, perpendicular to the axis of the stud 13, in the same angular direction as stud thread 13a, and the mid-point of each of the edges is disposed on a common diameter of the stud. The lower edge 14a of nut 14 engages tube 20 to compress it against walls 16 and 17, and preferably lies in a plane perpendicular to the stud and nut axes. Thus, with relation to the direction of rotation of nut 14 which would cause a movement of the nut toward base 12, the space between the trailing portions 16a' and 17a' of the wall edges and nut edge 14a is greater than the space between the leading portions of 16a'' and 17a'' of the wall edges and the nut edge. As a result, a portion of tube 20 disposed between the trailing edge portions of the walls and the nut edge is compressed substantially less than the portion of the tube between the leading portions and the nut. It has been found that with this arrangement of tube compression, "cold flow" reformation of the tubing tending to alter its flow characteristics is effectively eliminated due to the compensating effect of the relatively unconstricted portion of the tube.

To increase the ease of adjustment of the nut 14 and thereby improve the accuracy of control obtainable with the regulator, nut 14 is enlarged radially outwardly as at 14b to extend substantially laterally beyond the lateral extent of walls 16 and 17. The annular enlargement 14b may be serrated or knurled as desired to improve further the ease of manipulation thereof.

Regulator 10 may be formed of a moldable material such as plastic. To provide necessary strength for precluding breakage of the base member 11, the base member is preferably formed of a high impact polystyrene plastic, and, to improve the ease of adjustment of nut 14 on stud 13, the nut may be formed of another plastic, such as nylon, having improved lubricating characteristics.

In use, tube 20 is extended through channel 15 and nut 14 is suitably advanced to compress the tube between its lower edge 14a and the edges 16a and 17a of walls 16 and 17. The constriction of tube 20 is adjusted to the point where the desired rate of flow is obtained, the regulator being allowed to remain at this setting, as desired. As discussed above, where a relatively low rate of flow is desired, with tube 20 being constricted substantially so that only a small opening remains therethrough, the improved constricting means of the instant regulator effectively precludes undesirable change in the rate of flow subsequent to the setting of nut 14. By virtue of the improved ease of manipulation of nut 14, the rate of flow may be very accurately adjusted, this feature again being of considerable desirability at the relatively low rates of flow.

While we have shown and described certain embodiments of the invention, it is to be understood that it is capable of many modifications. Changes, therefore, in the construction and arrangement may be made without departing from the spirit and scope of the invention as defined in the appended claims.

We claim:

1. A flow regulator of the character described for use with a compressible tube, comprising: a base; threaded means upstanding from said base and defining a transverse channel; a wall upstanding from said base to definite a support extending across said channel; and coacting means associated with said threaded means for movement toward and from said wall, the confronting portions of the wall and coacting means being skewed relative to each other.

2. A flow regulator of the character described for use with a compressible tube, comprising: a base; threaded stud means upstanding from said base and defining a transverse channel; a pair of walls upstanding from said base, one each at opposite ends of said channel, and each having an upper edge defining a support means extending across said channel; and nut means associated with said threaded means for threaded movement toward and from said walls and having a lower edge disposable thereby for variable spaced relationship with said wall edges, each of said wall edges being arranged relative to said nut edge at an angle thereto whereby the spacing between said wall and nut edges increases in that direction of rotation of the nut means which effects movement thereof toward said walls.

3. A flow regulator of the character described for use with a compressible tube, comprising: a base, a stud element having an exterior thread upstanding from said base and having a diametric slot therethrough defining a channel; a pair of walls upstanding from said base, one each at opposite ends of said channel, and each having an upper edge defining a support means extending across said channel; and a nut carried on said stud element for threaded movement toward and from said wall edges and having a leading edge lying in a plane perpendicular to the stud axis arranged to have a variable spaced relationship with said wall edges, said wall edges being inclined to said plane in the same angular direction as the adjacent stud thread portions and with the mid-point of each of said edges lying on a common diameter of said stud.

4. The flow regulator of claim 1 wherein a pair of such walls are provided, one each at opposite ends of said channel.

5. A flow regulator of the character described for use with a compressible tube, comprising: a base; threaded stud means upstanding from said base and defining a transverse channel; one or more walls upstanding from said base, at opposite ends of said channel, and each having an upper edge defining a support means extending across said channel; a nut means associated with said threaded means for threaded movement toward and from each wall and having a lower edge disposable thereby for variable spaced relationship with each wall edge, each wall edge being arranged relative to said nut edge at an angle thereto whereby the spacing between said wall and nut edges increases in that direction of rotation of the nut means which effects movement thereof toward the wall.

References Cited in the file of this patent

UNITED STATES PATENTS 2,502,915    Atkins _____ Apr. 4, 1950

FOREIGN PATENTS 440,782    Germany _____ of 1927